United States Patent [19]
Takase et al.

[11] 3,860,532
[45] Jan. 14, 1975

[54] METHOD FOR PREPARING SILICA-ALUMINA CATALYSTS FOR THE CONVERSION OF HYDROCARBON

[75] Inventors: Shinji Takase, Kawasaki; Takahiko Yamazi, Yokohoma, both of Japan

[73] Assignee: Nippon Oil Company, Limited, Minato-ku, Tokyo, Japan

[22] Filed: June 5, 1972

[21] Appl. No.: 259,384

[30] Foreign Application Priority Data
June 8, 1971 Japan.............................. 46-39829

[52] U.S. Cl. ........................... 252/453, 252/455 R
[51] Int. Cl. ........................ B01j 11/40, C01b 33/20
[58] Field of Search ...................... 252/453, 455 R

[56] References Cited
UNITED STATES PATENTS

| | | | |
|---|---|---|---|
| 2,387,596 | 10/1945 | Marasic | 252/453 X |
| 2,872,410 | 2/1959 | Erickson | 252/453 X |
| 2,921,971 | 1/1960 | Holm et al. | 252/453 X |
| 3,210,293 | 10/1965 | O'Hara | 252/453 |
| 3,705,861 | 12/1972 | Oguchi et al. | 252/453 X |

*Primary Examiner*—C. Dees

[57] ABSTRACT

Method for preparing silica-alumina catalysts for the conversion of hydrocarbons which comprises reacting an aluminum compound and a silicon compound in an aqueous solution while maintaining the pH at about 10–14, adding to the reaction product an acid to adjust the pH to about 1–7, followed by, if necessary, addition of an aluminum compound and/or silicon compound, and raising pH of the resulting acid solution to about 5–9 by addition of an alkali.

6 Claims, No Drawings

METHOD FOR PREPARING SILICA-ALUMINA CATALYSTS FOR THE CONVERSION OF HYDROCARBON

BACKGROUND OF THE INVENTION

1. Field of the invention

This invention relates to a method for preparing novel silica-alumina catalyst useful for the conversion of hydrocarbons.

More particularly, it is concerned with (1) a process for preparing silica-alumina catalysts for the conversion of hydrocarbons which comprises reacting an aqueous solution of an aluminum compound and a silicon compound while maintaining the pH at 10–14, adding to the reaction product an acid to adjust the pH to 1–7, and then raising pH of the resulting acid solution to 5–9 by addition of an alkali and (2) a process for preparing silica-alumina catalysts for the conversion of hydrocarbons which comprises reacting an aqueous solution of an aluminum compound and a silicon compound while maintaining the pH at 10–14, adding to the reaction product an acid to adjust the pH to 1–7, followed by addition of an aluminum compound and/or a silicon compound and then raising pH of the resulting acid solution to 5–9 by addition of an alkali.

2. Description of the prior art

There are known three methods for the preparation of silica-alumina catalysts, namely, by sedimentation, coprecipitation and blending.

In general, the sedimentation method is used in most cases. Briefly stated, the method involves the following procedures: A silica hydrogel is prepared by adding an acid such as a mineral acid or carbon dioxide to a diluted solution of, for example, water glass; the hydrogel is subjected to aging; an aqueous solution of an aluminum salt such as aluminum sulfate is added to the resulting aqueous suspension of silica hydrogel to make it acid; a base such as aluminum hydroxide is then added to the acid suspension to settle alumina hydrate into the silica hydrogel skeleton thereby forming a silica-alumina hydrogel; and the silica-alumina hydrogel is subjected to aging, filtered, washed to remove undesired impurities such as alkali metals and sulfate ion and then dried for dehydration to obtain a silica-alumina gel catalyst. The sedimentation method is advantageous in that there is obtained the silica-alumina catalyst exerting a high cracking activity and having a large surface area. In addition, when mixed with a natural clay mineral, the addition is readily conducted by modification of the preparative procedures.

The blending method, which involves blending of a silica hydrogel and an alumina hydrogel, washing to remove impurities and drying for dehydration, is rarely commercially employed.

There are a few cases in which the co-precipitation method is used. The method is carried out as follows: A silica-alumina hydrogel is prepared by precipitating a silicon compound, e.g., water glass and an aluminum compound, e.g., aluminum chloride respectively from an acid or basic solution, by blending the solutions or by adding an acid or alkali to a blend of the solutions; the resulting silica-alumina hydrogel is washed and dried for dehydration to prepare a silica-alumina catalyst. Heretofore, the co-precipitation method has rarely been used, because the conditions under which co-precipitation is effected are difficultly determined, surface area of the resulting silica-alumina catalyst is small as compared with that in the sedimentation method and therefore low in cracking activity due to insufficient reaction between the silica and the alumina and impurities such as alkali metals, which are incorporated into the precipitation product, are not removed easily by washing.

We have previously found a method for preparing a silica-alumina catalyst for the conversion of hydrocarbons which comprises reacting an aluminum compound and a silicon compound in an aqueous solution at a pH of 10 or higher while maintaining the pH at 10 or higher and then subjecting the reaction mixture to aging at a pH in the range from 3 to 13.5. Whereas the silica-alumina catalyst prepared by the above-cited method are highly active in the hydrocarbon conversion reactions, are associated by a little formation of carbonaceous materials and are large in average pore radius, they should be improved in crush strength when molded by extrusion and therefore can be used satisfactorily in practice only when molded by compression.

SUMMARY OF THE INVENTION

It is an object of this invention to provide a method for preparing novel silica-alumina catalysts for the conversion of hydrocarbons which are highly active for the conversion of hydrocarbons.

Another object of the invention is to provide a method for preparing silica-alumina catalysts for the conversion of hydrocarbons which are associated with a less deposition of carbonaceous materials formed during the hydrocarbon conversion reaction and mainly causative of reduction in the activity and have a long catalytic life.

Still another object of the invention is to provide a method for preparing silica-alumina catalysts for the conversion of hydrocarbons which are easily molded by extrusion, have a high crush strength and accordingly can be used satisfactorily in practice.

One of the characteristic features of the silica-alumina catalysts for the conversion of hydrocarbons according to the present invention are pore radii in a wide distribution from about 20 to 250 A, an average pore radius being in the range from about 40 to 150 A, which is far larger than that in the known silica-alumina catalysts for the conversion of hydrocarbons being about 20–40A.

The silica-alumina catalysts for the conversion of hydrocarbons as referred to in this invention include silica-alumina catalysts and the silica-alumina catalysts having one or more metals which are active in hydrogenation suppported thereon.

DESCRIPTION OF THE INVENTION

In more details, the catalysts of this invention for the conversion of hydrocarbons are prepared by the process as described below. An aluminum compound and a silicon compound are reacted in aqueous solution while maintaining the pH at 10 or higher and preferably 10–14. To the resulting product is added an acid to adjust the pH to 1–7. Then, the pH of the acid solution is raised to 5–9 by addition of an alkali, followed by washing and drying for dehydration. Alternatively, an aluminum compound and a silicon compound are reacted in aqueous solution while maintaining the pH at 10 or higher, and preferably 10 to 14. To the resulting product is added an acid to adjust the pH to 1–7. After addition of an aluminum and/or a silicon compound to the acid solution, its pH is raised to 5–9 by addition of an alkali. Then, the resulting mixture is washed and dried for dehydration. One or more metals which are active in hydrogenation reaction may be introduced into these silica-alumina catalysts by conventional means. For example, one or more metals abovementioned or their aqueous solution may be added to the silica-alumina hydrate from which alkali metals have been removed by washing and the mixture blended and dried for dehydration. Alternatively, the dried and dehydrated silica-alumina may be impregnated with an aqueous solution containing the metal which is active in hydrogenation followed by drying for dehydration.

The silica-alumina prepared by the method according to this invention usually contains 5–95% by weight of silica and 95–5% by weight of alumina, preferably 30–90% by weight of silica and 70–10% by weight of alumina. If desired, compounds of halogen such as fluorine or chlorine may be combined by conventional means. In such a case, the halogen content is preferably from 0.3 to 15% by weight on the basis of the catalyst.

When the catalyst carries above metals, their content is preferably from 0.2 to 60% by weight in terms of metal on the basis of dried and dehydrated silica-alumina. The carried amount varies depending upon nature and combination of the metal, properties of the carrier and the like.

The metals which are active in hydrogenation reaction as referred to in the present invention mainly means metals of Groups IB, VI, VII and VIII in the Periodic Table, for example, copper, silver, chromium, molybdenum, tungsten, manganese, rhenium, iron, cobalt, nickel, platinum, palladium, ruthenium, rhodium, iridium and the like metals and oxides and sulfides of these metals. These metals may be used in combination of two or more members in many cases. For example, combinations of metals such as nickel-tungsten, cobalt-molybdenum, nickel-cobalt-molybdenum and platinum-rhenium and oxides and sulfides thereof.

The silicon compounds as referred to herein are water-soluble and include, for example, alkali metal silicates, water glass, silica sol and organic silicon compounds. Usually, water glass is employed. The aluminum compounds as referred to herein are water-soluble and include, for example, aluminum nitrate, aluminum sulfate, aluminum chloride, alum, sodium aluminate and organic aluminum compounds. If necessary, these compounds or solutions thereof may be used following adjustment of the pH to a desired value by addition of an acid or alkaline.

The silica-alumina catalysts obtained according to the preparative method of this invention are used for the conversion reactions of hydrocarbons. As the hydrocarbon conversion reactions are mentioned, for example, the catalytic cracking reaction of hydrocarbon fractions, the hydrogenation reaction, the hydrocracking reaction and the hydrogenative refining reaction. Compounds with boiling points of 20°C. or higher obtained from petroleum, coal and the like are used as the hydrocarbon. Of course, the hydrocarbon may be either in mixture or in single substance.

The reaction conditions under which the catalyst is used for hydrogenation treatment of hydrocarbons are, in general under hydrogen pressure, a reaction temperature from 100° to 500°C., a liquid space velocity from 0.1 to 10.0 vol./vol./hr. and a hydrogen flow from 100 to 10,000 NTP liter/liter of starting material. The starting hydrocarbon is contacted with the catalyst in the presence of hydrogen under these conditions. The reaction condition may be varied depending upon properties and nature of the starting hydrocarbon, nature and properties of the desired product, the catalyst employed, type of the reaction and the like. Any known type of the hydrocarbon conversion reaction, the fixed bed, moving bed or fluidized bed, may be employed as desired.

The method for preparing the catalysts for the conversion of hydrocarbons is exemplified below. As the silicon source for the final catalyst is used, for example, water glass, which is added, for example, to an aqueous ammonic solution. The ammonia is added in order to maintain pH in the reaction of a mixture of the silicon compound and an aluminum compound at lowest at 10 as well as to accelerate the reaction. The maintenance of pH at lowest at 10 may be effected by addition of an inorganic or organic base other than ammonia. If the pH is maintained at lowest at 10 in the absence of the base, it may not be added. It is, however, preferable to carry out the reaction in the presence of a base. Then an aluminum compound as the aluminum source in the final catalyst, for example, aluminum nitrate in aqueous solution is added to the aqueous ammoniac solution of water glass previously prepared, followed by mixing. The addition and mixing are conducted at a temperature, say, from −10° to 90°C. Until completion of the reaction between the silicon compound and the aluminum compound pH of the reaction mixture should be maintained at 10 or higher. After completion of the addition of aqueous solution of aluminum nitrate the mixed solution containing the reaction product is subjected to aging for a period of time from 0.1 to 240 hours, preferably at a temperature from −10° to 90°C. Aging is not an essential feature of the present invention, but it is desirable to be carried out. By changing the aging conditions, satisfactory and excellent catalysts may be obtained. Preferable aging range is 0.5 to 48 hours. The aging is followed by addition of an acid to adjust the pH to 1–7 and the resulting acid solution is allowed to stand for 0.1–100 hours. Then, an alkali, for example, aqueous ammonia is added to raise the pH to 5–9. Preferably after carrying out further aging for additional 0.1–240 hours, the mixed solution containing silica-alumina hydrate thus obtained is filtered and washed with a diluted solution, for example, of aqueous ammonia, ammonium nitrate or ammonium chloride to remove impurities such as alkali metals. After the removal drying is conducted at 60°–150°C. for 2–100 hours. The washing and the drying may be carried out in the reversed order. After the drying calcination is conducted at 300°–800°C. for 1-48 hours. In this method of preparation, an alternative process which involves addition of at least one of a fresh aluminum compound and/or a fresh silicon compound after the adjustment of pH to 1–7 by the addition of an acid, further addition of an alkali to adjust the pH to 5–9, aging, filtering and washing may be applied. There are prepared silica-alumina catalysts by these processes. Conventionally used procedures for washing, drying and calcination may be satisfactorily applied. The introduction of one or more above metals into the silica-alumina may be effected by conventional means. For example, one or more active metals or their aqueous solution is added to and blended with the silica-alumina hydrate after removal of impurities such as alkali metals by washing but before drying and calcination, followed by drying for dehydration. Alternatively, an aqueous solution containing the active metal is added for impregnation to the dried dehydrated silica-alumina, followed by drying for dehydration. It is desired to use as compounds of the above active metals such a compound as nitrate or ammonium salt which will not produce substances reducing the catalytic activity when dried and dehydrated.

If the reaction between a silicon compound and an aluminum compound is carried out at pH beyond the scope of this invention, namely, below 10, the silica-alumina catalysts thus obtained which are low in activity and associated with deposition of a larger amount of carbonaceous materials will be inferior to the silica-alumina catalysts of this invention.

If the reaction is carried out at a pH of 10 or higher but pH adjustment as specified herein is not conducted in the subsequent step, there will be formed a catalyst with a lower crush strength as shown in a comparative example below.

Such conditions as the order of additions of the aluminum compound and the silicon compound, the type of reaction and the acid and alkali added is not limited to those described hereinabove but may be any ones as desired provided that they are within the scope of claims.

The silica-alumina catalysts for the conversion of hydrocarbons prepared according to the present invention may be molded by any known method. For example, extrusion molding, compression molding or oil dropping method may be used. Extrusion molding is preferably employed.

The reaction between a silicon compound and an aluminum compound as described above implies, unlike the case wherein silica gel and alumina gel are merely mixed, formation of a chemical bonding between the silica and the alumina in the finally prepared silica-alumina. The chemical bonding of the said silica and alumina may be stoichiometrical or non-stoichiometrical.

The mechanism by which the catalysts prepared according to the method of this invention are excellent in both activity and strength is not exactly clear, but it is certain that the pH adjustments made as predetermined according to this invention afford not only improvement in skeletone structure but also characteristic features to physical and chemical properties of the silica-alumina product.

DESCRIPTION OF PREFERRED EMBODIMENTS

This invention will be described in more details by means of examples. It is to be understood that the invention is not limited to these examples.

EXAMPLE 1

To 100 ml. of 14% aqueous ammonia were added 130 ml. of an aqueous solution containing 24.5 g. of sodium metasilicate. The mixture was stirred for 1 hour. To the resulting mixture were slowly added 35 ml. of an aqueous solution containing 9.5 g. of aluminum nitrate. The pH after completion of the addition was 12.6. Stirring was continued for additional 1 hour, followed by addition of 10% hydrochloric acid to adjust the pH to 1.1 and then stirring for 20 minutes. To the resulting acid solution was added aqueous ammonia to adjust the pH to 8. The resulting mixture was stirred for 1 hour and then allowed to stand overnight. The product was filtered and the silica-alumina hydrate from the filtration washed with five portions of 500 ml. of 3% aqueous solution of ammonium nitrate to remove alkali metals. The washed silica-alumina hydrate was molded by extrusion, dried at 120°C. for 24 hours and calcined at 550°C. for 5 hours. The catalyst was 5 mm. in length and 3 mm. in diameter, which was analyzed to find a surface area of 300 m.$^2$/g., a silica content of 80.2% by weight, an alumina content of 19.8% and a sodium content less than 0.1% by weight. The catalyst is referred to as Catalyst [A].

EXAMPLE 2

To 300 ml. of 10% aqueous ammonia were added 290 ml. of an aqueous solution containing 37 g. of water glass. The mixture was stirred for 5 hours. To the resulting mixture were added 80 ml. of an aqueous solution containing 18 g. of aluminum nitrate. The pH after completion of the addition was 13. After allowed to stand one day hydrochloric acid was added to adjust the pH to 4, followed by stirring for 3 hours. Additional hydrochloric acid was added to adjust pH to 3.5. Then, ammonia was added to adjust the pH to 7. After stirred for 1 hour the resulting mass was allowed to stand for 2 days, followed by filtration. The silica-alumina hydrate from the filtration was washed with 5% aqueous solution of ammonium chloride. After the washing the mass was dried at 120°C. for 24 hours and calcined at 550°C. for 5 hours. The product was analyzed to find a surface area of 209 m.$^2$/g., a silica content of 74.3% by weight, an alumina content of 25.7% by weight and a sodium content less than 0.1% by weight. The catalyst referred to as Catalyst [B].

EXAMPLE 3

To 100 ml. of 14% aqueous ammonia were added 200 ml. of an aqueous solution containing 24.5 g. of sodium metasilicate. The mixture was stirred for 35 minutes. To the resulting mixture were added 60 ml. of an aqueous solution containing 9.5 g. of aluminum nitrate. The pH after completion of the addition was 12.6. Stirring was continued for additional 15 minutes, followed by addition of hydrochloric acid to adjust the pH to 2. To the acid solution were then added 90 ml. of an aqueous solution containing 25 ml. of 18% hydrochloric acid and 10 g. of water glass. The mixture was stirred for 10 minutes, followed by addition of aqueous ammonia to adjust the pH to 8. The resulting mass was stirred for 1 hour and allowed to stand overnight. Then the resulting mass was filtered and the silica-alumina hydrate from the filtration washed to remove the alkali metal. The hydrate was then molded by extrusion, dried at 120°C. for 24 hours and calcined at 550°C. for 5 hours. The catalyst was 5 mm. in length and 3 mm. in diameter, which was analyzed to find a surface area of 270 m.$^2$/g., a silica content of 86.3% by weight, an alumina content of 13.7% by weight and a sodium content less than 0.1% by weight. The catalyst is referred to as Catalyst [C].

EXAMPLE 4

To 100 ml. of aqueous ammonia were added 150 ml. of an aqueous solution containing 24.5 g. of sodium metasilicate, followed by addition of 5 g. of sodium hydroxide. The mixture was stirred for 1 hour. To the resulting mixture was added aqueous solution containing 9.5 g. of aluminum nitrate. The pH after completion of the addition was 13.1. Stirring was continued for additional 1 hour, followed by addition of hydrochloric acid to adjust the pH to 3. The acid solution was allowed to stand for 1 hour, followed by addition of 20 ml. of 18% hydrochloric acid and 110 ml. of an aqueous solution containing 20 g. of sodium metasilicate. The pH resulted was 2.6. Stirring was made for additional 30 minutes, followed by addition of aqueous ammonia to adjust the pH to 7.5. The resulting mass was stirred for 1 hour and then allowed to stand for one day. The mass was filtered and the silica-alumina hydrate from the filtration washed with 3% aqueous solution of ammonium nitrate. The hydrate was molded by extrusion, dried at 120°C. for 24 hours and calcined at 550°C. for 5 hours. The catalyst was 5 mm. in length and 3 mm. in diameter, which was analyzed to find a surface area of 307 m.$^2$/g., a silica content of 89.5% by weight, an alumina content of 10.5% by weight and a sodium content less than 0.1% by weight. The catalyst is referred to as Catalyst [D].

EXAMPLE 5

To 200 ml. of aqueous ammonia were added 300 ml. of an aqueous solution containing 37 g. of water glass and then 140 ml. of an aqueous solution containing 32 g. of aluminum nitrate. The pH after completion of the addition was 10.2. The mixture was stirred for 1 hour, followed by addition of hydrochloric acid to adjust the pH to 3. To the resulting mixture was then added an aqueous solution containing 38 ml. of 18% hydrochloric acid, 9.6 g. of aluminum nitrate and 20 g. of water glass. Stirring was made for 1 hour, followed by addition of aqueous ammonia to adjust the pH to 7.5. The resulting mass was allowed to stand for two days and then filtered. The silica-alumina hydrate from the filtration was repeatedly washed with 3% aqueous solution of ammonium nitrate. The hydrate was molded by extrusion, dried at 120°C. for 24 hours and calcined at 550°C. for 5 hours. The catalyst was 5 mm. in length and 3 mm. in diameter, which was analyzed to find a silica content of 79.1% by weight, an alumina content of 20.9% by weight, a sodium content less than 0.1% by weight and a surface area of 228 m.$^2$/g. The catalyst is referred to as Catalyst [E].

COMPARATIVE EXAMPLE

To 100 ml. of 14% aqueous ammonia were added 130 ml. of an aqueous solution containing 24.5 g. of sodium metasilicate. The mixture was stirred for 1 hour. To the resulting mixture were slowly added 35 ml. of an aqueous solution containing 9.5 g. of aluminum nitrate. The pH after completion of the addition was 12.6. Stirring was continued for additional one hour, followed by addition of 10% hydrochloric acid to adjust the pH to 3.5. The acid solution was stirred for 1 hour and, without adjustment of the pH up to 5–9, allowed to stand for one day. The resulting mass was filtered and the silica-alumina hydrate from the filtration repeatedly washed with 500-ml. portions of 3% aqueous solution of ammonium nitrate to remove the alkali metal. The washed silica-alumina hydrate was molded by extrusion, dried at 120°C. for 24 hours and calcined at 550°C. for 5 hours. The catalyst was 5 mm. in length and 3 mm. in diameter, which was analyzed to find a surface area of 185 m.$^2$/g., a silica content of 84.7% by weight, an alumina content of 15.3% by weight and a sodium content less than 0.1% by weight. The catalyst is referred to as Catalyst [F].

EXAMPLE 6

Cumene cracking activity and side crush strength were measured with Catalysts [A], [B], [C], [D], [E] and [F] prepared as above. The cumene cracking activity was determined using a pulse reactor at a reaction temperature of 350°C. The pulse reactor was filled with the catalyst in an amount of 60 mg. (approximately 1 cc.). Flow of helium as the carrier gas was 20 ml. per minute and amount of cumene introduced per pulse 2 μl. The side crush strength is expressed in terms of the pressure in Kg. required for crushing the catalyst when placed on the side between two parallel steel plates. Measurements were made on the side crush strength with 10 pellets and the average value was calculated. The results are shown in the table below.

| Catalyst | [A] | [B] | [C] | [D] | [E] | [F] |
| --- | --- | --- | --- | --- | --- | --- |
| Cumene cracking activity (mol.%) | 88.2 | 83.6 | 90.3 | 92.3 | 93.2 | 91.7 |
| Side crush strength (kg.) | 3.5 | — | 4.8 | 4.7 | 5.0 | 2.1 |

As seen from the table, the silica-alumina catalysts of this invention, [A], [B], [C], [D] and [E], have very high cracking activities and satisfactory crush strengths, the crush strength being higher than that with Catalyst [F].

EXAMPLE 7

This example is given in order to indicate the preparation of a high-quality base oil for lubricant by hydrocracking the propane deasphalted vacuum residuum.

To 700 ml. of an aqueous solution containing 121 g. of sodium metasilicate were added 400 ml. of 14% aqueous ammonia. The mixture was allowed to stand for 30 minutes, followed by slow addition of 155 ml. of an aqueous solution containing 51 g. of aluminum nitrate. The resulting mixture was stirred for one hour. There were obtained a silica-alumina hydrate precipitates. The pH after completion of the addition was 12.0. To the resulting mass was added hydrochloric acid to adjust the pH to 4, followed by stirring for additional two hours. The stirring was discontinued and the mass allowed to stand for 10 hours. To the mass were then added 420 ml. of an aqueous solution containing 20 ml. of 18% hydrochloric acid, 20 g. of sodium metasilicate and 109 g. of aluminum nitrate, followed by stirring for 1 hour. The pH was 2.8. To the resulting mixture was added aqueous ammonia to adjust the pH to 7 and the mass was allowed to stand for one day, which was then filtered. The silica-alumina hydrate from the filtration was washed with 2 liters of 3% aqueous solution of ammonium nitrate. The washing was repeated five times.

In 150 ml. of water were dissolved 30.2 g. of nickel nitrate and 17 g. of tungstenic acid. The solution and the silica-alumina hydrate prepared and washed as above were kneaded at 70°C. for 2 hours. The kneaded product was molded by extrusion, dried at 120°C. for 24 hours and calcined at 550°C. for 5 hours. The catalyst had a silica and alumina weight ratio of 1.2 and contained 7% by weight of nickel and 15% by weight of tungsten on the basis of the carrier. It was 5 mm. in length and 3 mm. in diameter. The side crush strength was 5.1 kg./cm.$^2$G.

The reaction was carried out using a fixed bed flowing reaction vessel. The reaction conditions were: A temperature of 400°C.; a pressure of 100 kg./cm.$^2$G; an LHSV of 1.0 vol./vol./hr.; and a hydrogen flow of 1500 liter - H$_2$/liter - oil (NTP). Properties of the starting oil and the product base oil for lubricant are shown in the table below in comparison with the results with a commercially available nickel (6 wt.%) - tungsten (15 wt.%) - silica/alumina (silica to alumina weight ratio being 3) when used under the same reaction conditions.

| Property | Feed oil | Use of the catalyst of this invention | Use of the commercial catalyst |
|---|---|---|---|
| Viscosity at 98.9°C. cst | 20.65 | 9.850 | 5.815 |
| Viscosity index | — | 131 | 110 |
| Sulfur content in wt.% | 1.62 | 0.01 | 0.01 |
| Nitrogen content in p.p.m. | 240 | ≤20 | 40 |
| Yield of Lubricant fraction in vol.% | — | 67.8 | 48.2 |

As compared with the commercially available catalyst, use of the catalyst of this invention was found to afford a lubricant fraction in a high yield, the lubricant having a high viscosity index and containing low sulfur and nitrogen.

EXAMPLE 8

In this example was investigated activity of a cobalt-molybdenum-silica/alumina catalyst obtained by the preparative method of this invention for hydrogenative desulfuration and denitrogenation reaction.

The preparative method of the catalyst is as follows:

In 500 ml. of water are dissolved 258 g. of aluminum nitrate, followed by addition of 3% aqueous ammonia solution while avoiding precipitation to adjust the pH to 4.7. Separately, 97 g. of water glass were dissolved in 450 ml. of pure water. The two solutions were simultaneously added slowly drop by drop to a concentrated aqueous ammonia. The pH after completion of the addition was 12. The resulting mixed solution containing the silica-alumina hydrate precipitates was allowed to stand for 10 hours, followed by addition of 5% aqueous solution hydrochloric acid to adjust the pH to 4.2. The mixture was then allowed to stand for additional 10 hours. After adjustment of the pH to 7 by the addition of aqueous ammonia the resulting mass was stirred for one hour and allowed to stand for 1 day. The mass was filtered and the silica-alumina hydrate from the filtration washed with 2% aqueous solution of ammonium chloride to remove the alkali metal. The washed hydrate was molded by extrusion, dried at 120°C. for 24 hours and calcined at 550°C. for 5 hours. The silica-alumina had a silica-alumina weight ratio of 0.45.

To 280 ml. of water were added 265 g. of ammonium paramolybdenate and to the mixture added with stirring 530 ml. of 28% aqueous ammonia to a homogeneous solution. To the solution was slowly added a solution of 211 g. of cobalt nitrate in 210 ml. of water to prepare a dipping solution containing cobalt and molybdenum. In the dipping solution was dipped the silica-alumina above prepared for 3 hours. The supernatant was removed and the remainder dried at 120°C. for 24 hours and calcined at 500°C. for 5 hours. The analysis indicated 2.9% by weight of cobalt and 10% by weight of molybdenum carried in terms of metal.

A hydrogen treatment was conducted on an Arabian medium residual oil from distillation at ordinary pressure using the catalyst under the reaction conditions: A reaction temperature of 400°C.; a reaction pressure of 150 kg./cm.$^2$G; an LHSV of 0.8 vol./vol./hr.; and a hydrogen flow of 1,000 NTP liter/liter - oil. The reaction was carried out using a fixed bed flowing reaction vessel. Properties of the feed oil and the hydrogen-treated oil fraction boiling at 300°C. and higher are shown in the table below. Yield of the fraction boiling at 300°C. and higher was 92% by volume. The hydrogen-treated oil was a sample at 200 hours after initiation of the reaction.

| Property | Feed oil | Hydrogen-treated oil |
|---|---|---|
| Viscosity cst 50°C. | 230.0 | 85.47 |
| Residual carbon (wt.%) | 9.48 | 5.13 |
| Petroleum ether-insoluble fraction | 4.75 | 2.01 |
| Vanadium (ppm) | 30 | 20 |
| Nickel (ppm) | 13 | 7 |
| Sulfur content (wt.%) | 3.69 | 0.80 |
| Nitrogen content (wt.%) | 0.28 | 0.06 |

As shown above, the catalyst of this invention exerts a high hydrogenative desulfuration and denitrogenation activity even with the residual oil regarded to be most difficult in hydrorefining.

We claim:

1. Method for preparing silica-alumina catalysts for the conversion of hydrocarbons which comprises reacting an aluminum salt and a silicon salt in aqueous solution while maintaining the pH at about 10–14, said salts being water-soluble at said pH, adding an acid to adjust the pH of the solution to about 1 to 7, and raising the pH of the resulting acid solution to about 5–9 by addition of an alkali.

2. Method according to claim 1 wherein the source of said aluminum salt is a member selected from the group consisting of aluminum nitrate, aluminum sulfate, aluminum chloride, alum and sodium aluminate.

3. Method according to claim 1 wherein the source of said silicon salt is a member selected from the group consisting of alkali metal silicates, water glass, and silica sol.

4. Method according to claim 1 wherein said aluminum salt and said silicon salt are used in such amount that the resulting silica-alumina catalyst contains 5–95% by weight of silica and 95–5% by weight of alumina.

5. Method according to claim 1 wherein at least one metal selected from the group consisting of copper, silver, chromium, molybdenum, tungsten, manganese, rhenium, iron, cobalt, nickel, platinum, palladium, ruthenium, rhodium and irridium is further incorporated in an amount of 0.2 to 60% by weight on the basis of the silica-alumina catalyst.

6. Method according to claim 1 including the further step of dissolving additional aluminum salt and/or silicon salt in the acidified solution, before the step of increasing the pH.

* * * * *